(12) United States Patent
Bahr et al.

(10) Patent No.: US 9,878,848 B2
(45) Date of Patent: Jan. 30, 2018

(54) FRICTION FEEDER

(71) Applicant: MGS MACHINE CORPORATION, Maple Grove, MN (US)

(72) Inventors: Timothy Allen Bahr, Brooklyn Park, MN (US); Richard Allen Bahr, Maple Grove, MN (US)

(73) Assignee: MGS Machine Corporation, Maple Grove, MN (US)

( * ) Notice: Subject to any disclaimer, the term of this patent is extended or adjusted under 35 U.S.C. 154(b) by 0 days.

(21) Appl. No.: 15/261,852

(22) Filed: Sep. 9, 2016

(65) Prior Publication Data

US 2017/0073162 A1    Mar. 16, 2017

Related U.S. Application Data

(60) Provisional application No. 62/217,466, filed on Sep. 11, 2015.

(51) Int. Cl.
| | |
|---|---|
| *B65G 23/44* | (2006.01) |
| *B65G 13/11* | (2006.01) |
| *B65G 13/00* | (2006.01) |
| *B65G 15/12* | (2006.01) |
| *B65G 47/88* | (2006.01) |

(52) U.S. Cl.
CPC ............. *B65G 13/00* (2013.01); *B65G 15/12* (2013.01); *B65G 47/8815* (2013.01); *B65G 2207/48* (2013.01)

(58) Field of Classification Search
CPC ................................ B65G 23/44; B65G 13/11
USPC ................................ 198/804, 812, 813, 617
See application file for complete search history.

(56) References Cited

U.S. PATENT DOCUMENTS

| | | | | | |
|---|---|---|---|---|---|
| 4,739,371 | A * | 4/1988 | Ray ...................... | G03G 15/754 |
| | | | | 399/116 |
| 4,983,146 | A * | 1/1991 | Charles .................. | B82Y 15/00 |
| | | | | 399/288 |
| 5,004,223 | A * | 4/1991 | Okui ...................... | B65H 5/026 |
| | | | | 198/816 |
| 5,022,514 | A * | 6/1991 | Lofberg ................. | B65G 15/00 |
| | | | | 198/813 |
| 5,632,372 | A * | 5/1997 | Steinbuchel, IV ..... | B65G 23/44 |
| | | | | 198/813 |
| 5,934,449 | A * | 8/1999 | Dolan .................... | B65G 17/08 |
| | | | | 198/806 |
| 6,349,812 | B1 * | 2/2002 | Epp ........................ | B65G 23/44 |
| | | | | 198/318 |
| 6,585,262 | B2 * | 7/2003 | Nakanishi .............. | B65G 47/29 |
| | | | | 198/460.1 |

(Continued)

*Primary Examiner* — Douglas A Hess
(74) *Attorney, Agent, or Firm* — Skaar Ulbrich Macari, P.A.

(57) ABSTRACT

Disclosed is a friction feeder configured to allow for the removal and replacement of wear parts such as friction belts, drive belts and friction meter wheels without the need to significantly disassemble the machine and without the need for tools. The rollers are mounted only on one end in a cantilever manner to aid in the access to the friction belts. The rollers are releasably held in tension with a hand-actuatable piston. The roller ball assembly can be rotated clear of the product holding position without the use of tools. The friction meter wheel assembly can then be accessed and replaced. A piston also releasably holds the drive belt pulleys in tension so that the drive belts can be replaced.

20 Claims, 23 Drawing Sheets

(56) References Cited

U.S. PATENT DOCUMENTS

| | | | | |
|---|---|---|---|---|
| 6,796,419 B2 * | 9/2004 | Sousek | ............... | F16H 7/1209 |
| | | | | 198/813 |
| 6,945,530 B2 * | 9/2005 | Cinotti | ................. | B65G 17/26 |
| | | | | 198/626.5 |
| 7,556,069 B2 * | 7/2009 | Chuang | ................... | B24B 7/06 |
| | | | | 144/114.1 |
| 7,650,729 B2 * | 1/2010 | Whittlesey | ............ | A22C 11/02 |
| | | | | 198/813 |
| 7,681,719 B2 * | 3/2010 | Hosch | .................. | B65G 15/62 |
| | | | | 198/841 |
| 7,730,914 B2 * | 6/2010 | Lin | ....................... | B27B 25/04 |
| | | | | 144/242.1 |
| 8,146,734 B2 * | 4/2012 | Shoji | .................... | B65G 21/10 |
| | | | | 198/813 |
| 8,245,832 B2 * | 8/2012 | Fickeisen | .............. | B65G 15/00 |
| | | | | 198/313 |
| 9,521,807 B2 * | 12/2016 | Ubaldi | ................... | A01D 57/20 |

* cited by examiner

FRICTION FEEDER

PRIORITY

This application claims the priority benefit of U.S. Provisional Application No. 62/217,466, filed on Sep. 11, 2015, which is hereby incorporated herein by reference in its entirety.

FIELD

The present invention relates generally to friction feeders, and more particularly, to friction feeders with improved maintainability.

BACKGROUND

Friction belts, drive belts and friction wheels of typical friction feeders wear and need to be periodically replaced. Replacement of these items on conventional friction feeders is quite inconvenient and time consuming because the machine must be largely disassembled with tools to access the wear parts, and then reassembled once the replacement parts are fitted. This replacement process is costly due to the down time and also due to operator costs to perform the maintenance. Provision of the required tools also adds to the cost and time to complete the replacement procedures. Therefore, there is a need to provide an improved friction feeder possessing the ability to quickly and easily change out wear parts.

SUMMARY

The disclosure includes a friction feeder configured to allow for the removal and replacement of wear parts such as friction belts, drive belts and friction meter wheels without the need to significantly disassemble the machine and without the need for tools. The rollers are mounted only on one end in a cantilever manner to aid in the access to the friction belts. The rollers are releasably held in tension with a hand-actuatable piston. The roller ball assembly can be rotated clear of the product holding position without the use of tools. The friction meter wheel assembly can then be accessed and replaced. A piston also releasably holds the drive belt pulleys in tension so that the drive belts can be replaced.

The disclosure also includes a friction feeder device. The device includes a frame plate, a first cantilevered roller comprising a first end and a second end, wherein the first end is rotationally coupled to the frame plate, a second cantilevered roller comprising a first end and a second end, wherein the first end is rotationally coupled to the frame plate via a first movable bearing block, a first friction belt spanning across the second ends of each of the first and second cantilevered rollers; and a first piston comprising a first end, a second end and a manual release flange. The first end is coupled to the frame plate and the second end is coupled to the first movable bearing block. The manual release flange in the engaged position prevents the first end of the first piston from moving towards the second end of the first piston to maintain tension in the first friction belt. The manual release flange in the released position allows the first end of the first piston to move towards the second end of the first piston to allow the second ends of the first and second cantilevered rollers to move towards one another to release tension in the first friction belt.

A second friction belt can be disposed adjacent to the first friction belt and span across the second ends of each of the first and second cantilevered rollers.

The device can include a third cantilevered roller comprising a first end and a second end, wherein the first end is rotationally coupled to the frame plate, a fourth cantilevered roller comprising a first end and a second end, wherein the first end is rotationally coupled to the frame plate via a second movable bearing block, a third friction belt spanning across the second ends of each of the third and fourth cantilevered rollers; and a second piston comprising a first end, a second end and a manual release flange. The first end is coupled to the frame plate and the second end is coupled to the second movable bearing block. The manual release flange in the engaged position prevents the first end of the second piston from moving towards the second end of the second piston to maintain tension in the third friction belt. The manual release flange in the released position allows the first end of the second piston to move towards the second end of the second piston to allow the second ends of the third and fourth cantilevered rollers to move towards one another to release tension in the third friction belt.

The friction feeder device can further include a drive motor. The frame plate defines a first and second side. The first and second cantilevered rollers extend away from the first side of the frame plate and a drive motor extends away from the second side of the frame plate.

A main housing can be secured to the frame plate and enclose the drive motor. The first and second cantilevered rollers are not housed within an enclosure.

A motor pulley can be disposed adjacent the second side of the frame plate which is coupled to the drive motor. The drive motor is pivotally coupled to the second side of the frame plate. A primary pulley is disposed adjacent the second side of the frame plate which is rotationally coupled to one of the first and second cantilevered rollers. A drive belt spans between the motor pulley and the primary pulley. A second piston comprising a first end, a second end and a manual release flange is coupled to the drive motor via the first end and the second end is coupled to the second side of the frame plate. The manual release flange in the engaged position prevents the first end of the second piston from moving towards the second end of the first piston to maintain tension in the drive belt. The manual release flange in the released position allows the first end of the second piston to move towards the second end of the second piston to allow the motor to pivot towards the primary pulley to release tension in the drive belt.

The primary pulley can be movably coupled to one of the first and second cantilevered rollers. A secondary pulley can be disposed adjacent the second side of the frame plate. A secondary belt can span between the secondary pulley and the primary pulley.

An adjustable tensioner can be secured to the second side of the frame plate and engage the secondary belt and/or the drive belt.

The friction feeder device can further include a metering tower, a cantilevered arm pivotally coupled to a metering tower, the cantilevered arm pivoting between a vertical orientation and an offset position; and a release piston coupled to the cantilevered arm and located to engage an aperture defined in the metering tower when the cantilevered arm is in the vertical positon and to engage a sidewall of the metering tower when the cantilevered arm is in the offset position.

A meter wheel can be located adjacent to the first friction belt and driven in incremental rotational movements via a solenoid coupled to the meter wheel.

A releasable back plate can be disposed adjacent to the meter wheel. A release lever is coupled to the meter wheel and defines an operating position where the back plate partially surrounds the meter wheel and a release position where the back plate can be moved away from the meter wheel.

A side plate can be provided which engages one end of the meter wheel. The side plate is releasably secured to the meter wheel via a knob disposed in a slot defined in the side plate.

The disclosure also includes a friction feeder system, including a frame plate, a drive motor pivotally coupled to the frame plate, a motor pulley disposed adjacent to the frame plate which is coupled to the drive motor, a primary pulley disposed adjacent the frame plate and rotationally coupled to a drive roller, a drive belt spanning between the motor pulley and the primary pulley. A piston comprising a first end, a second end and a manual release flange is coupled to the drive motor and the second end is coupled to the frame plate. The manual release flange in the engaged position prevents the first end of the piston from moving towards the second end of the piston to maintain tension in the drive belt. The manual release flange in the released position allows the first end of the piston to move towards the second end of the piston to allow the motor to pivot towards the primary pulley to release tension in the drive belt.

A secondary belt can span between a secondary pulley and the primary pulley. An adjustable tensioner also can be secured to the frame plate and engage at least one of the drive belt and the secondary belt.

The disclosure still further includes a method of replacing wear parts of a friction feeder. The method includes moving a manual release flange of a piston from an engaged position to a released position, thereby contracting a length dimension of the piston and allowing cantilevered ends of a pair of rollers to move towards one another to release tension in a friction belt spanning between the cantilevered ends of the pair of rollers, removing the friction belt from the cantilevered ends of the pair of rollers, fitting a replacement friction belt to the cantilevered ends of the pair of rollers, and moving the manual release flange of the piston from the released position to the engaged position, thereby expanding the length dimension of the piston and forcing the cantilevered ends of the pair of rollers to move away from one another to create tension in a friction belt spanning between the cantilevered ends of the pair of rollers.

The method can further include moving a manual release flange of a second piston from an engaged position to a released position, thereby contracting a length dimension of the second piston and allowing a drive motor to pivot towards a primary pulley to release tension in a drive belt spanning between a drive pulley and the primary pulley.

The method can additionally include releasing a third piston coupled to a cantilevered arm from an aperture defined in a metering tower, pivoting the cantilevered arm away from the metering tower to an offset position, and maintaining the offset position by abutting a portion of the third piston against a side wall of the metering tower.

The method can also include releasing a back plate surrounding a portion of a meter wheel, and moving the back plate away from the meter wheel to expose an interface of the meter wheel with a friction belt.

The method yet further can include releasing a meter wheel by rotating a knob engaged with the a side plate engaging one end of the meter wheel, pivoting the knob away from the side plate, removing the side plate, and removing the meter wheel by sliding the meter wheel off of a shaft about which the meter wheel rotates.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
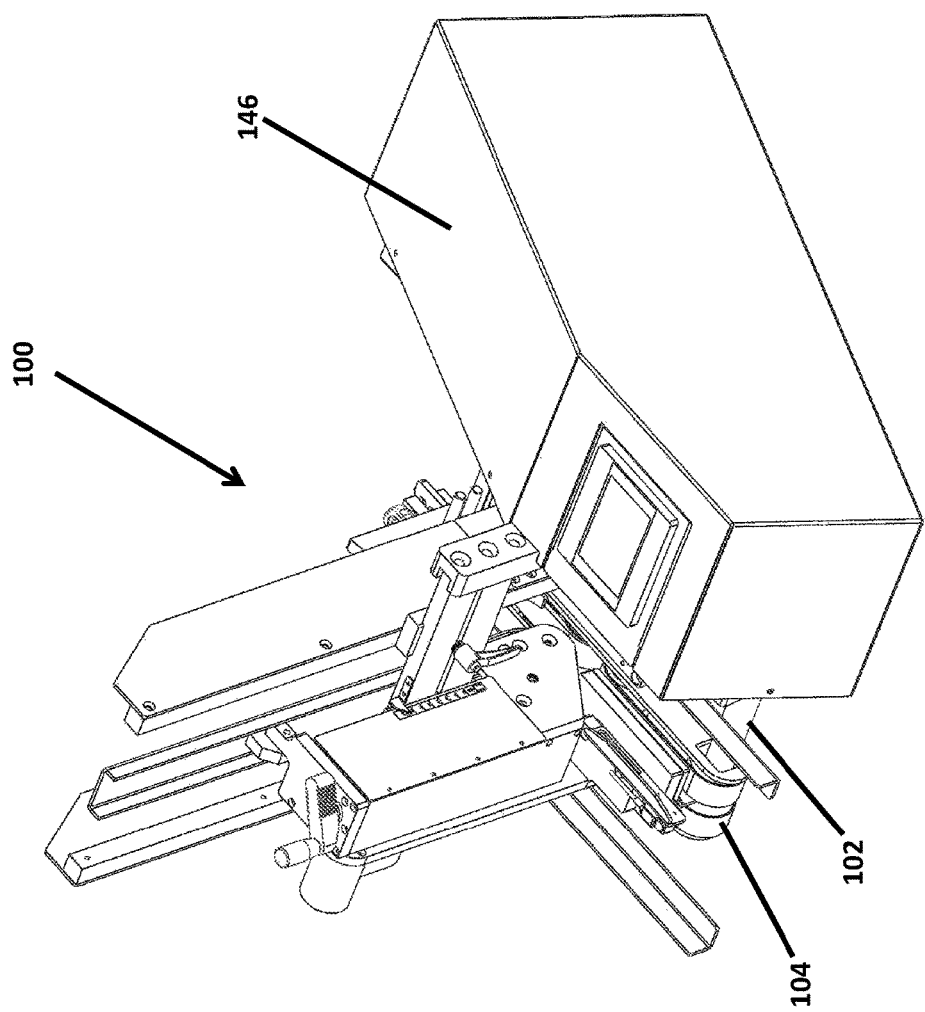
FIG. 1 is a perspective view of a friction feeder according to certain embodiments.
Figure 2:
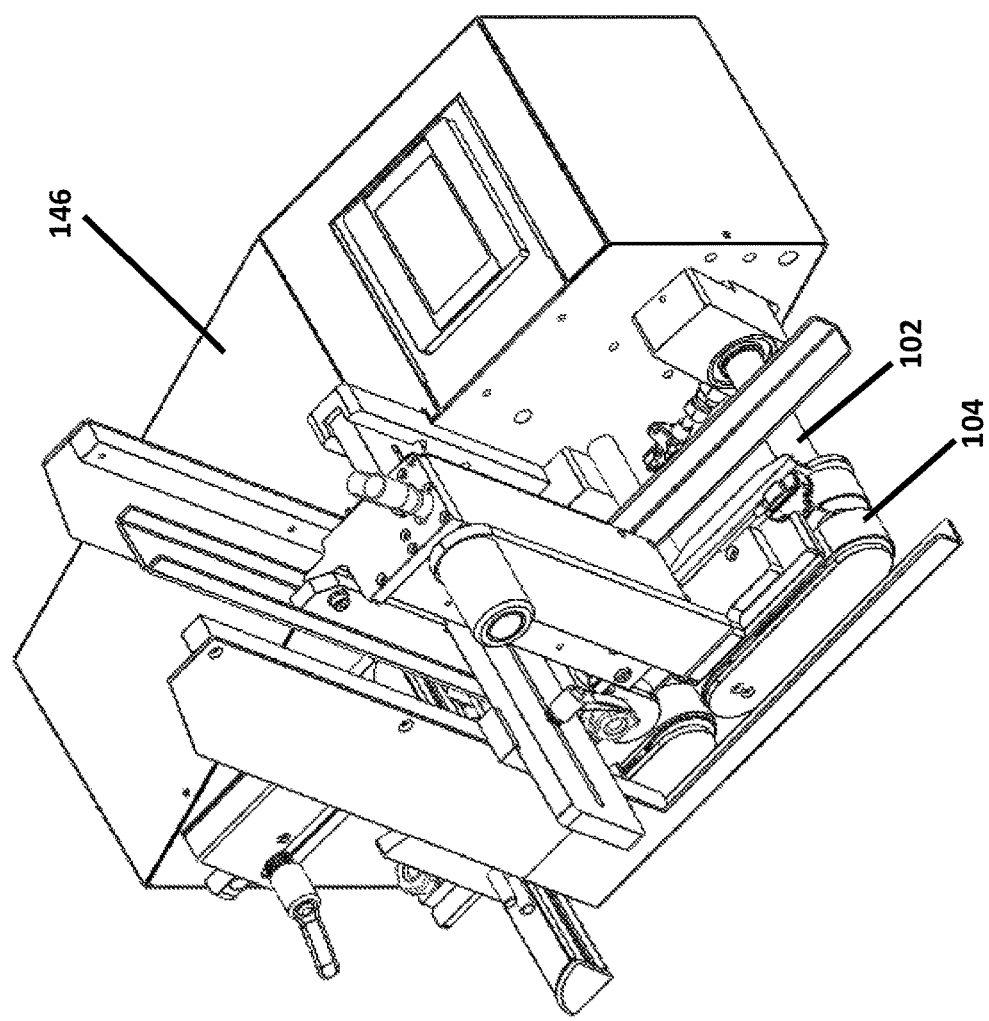
FIG. 2 is another perspective view of a friction feeder according to certain embodiments.
Figure 3:
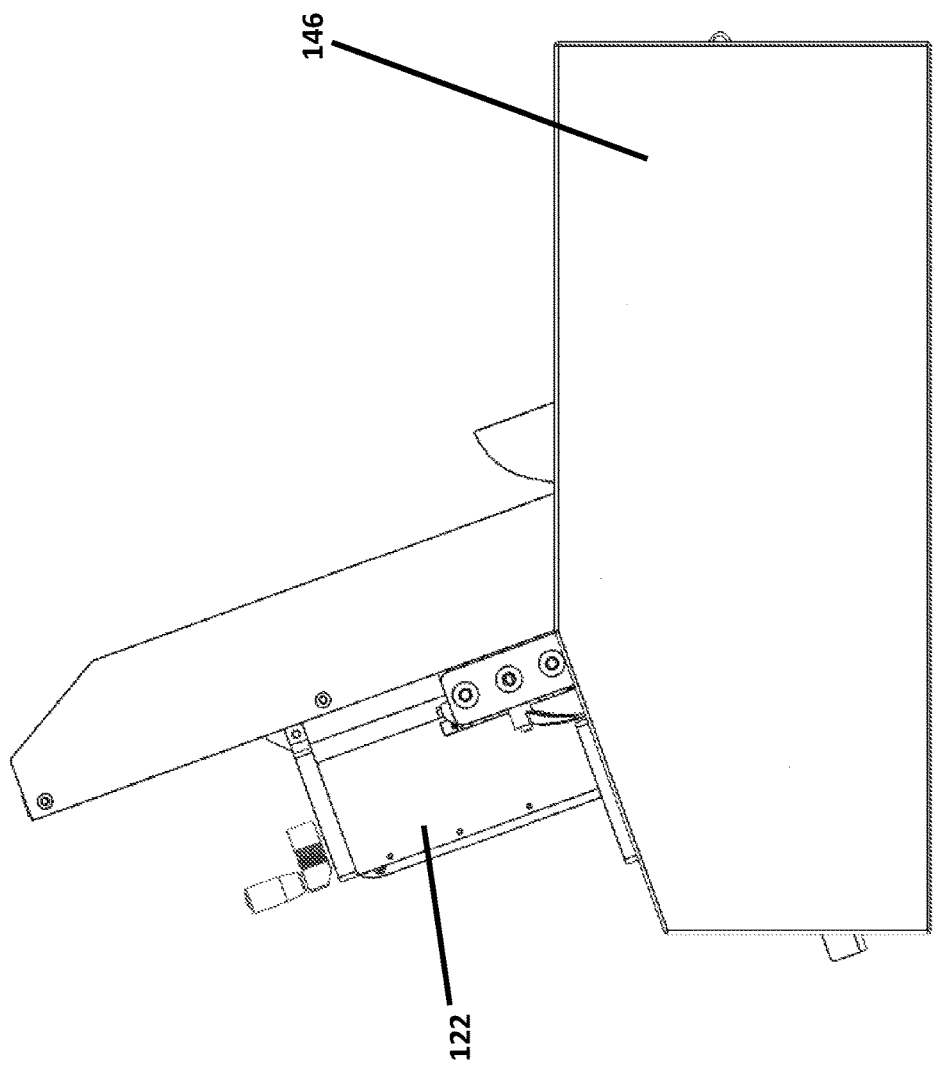
FIG. 3 is a side view of a friction feeder according to certain embodiments.
Figure 4:
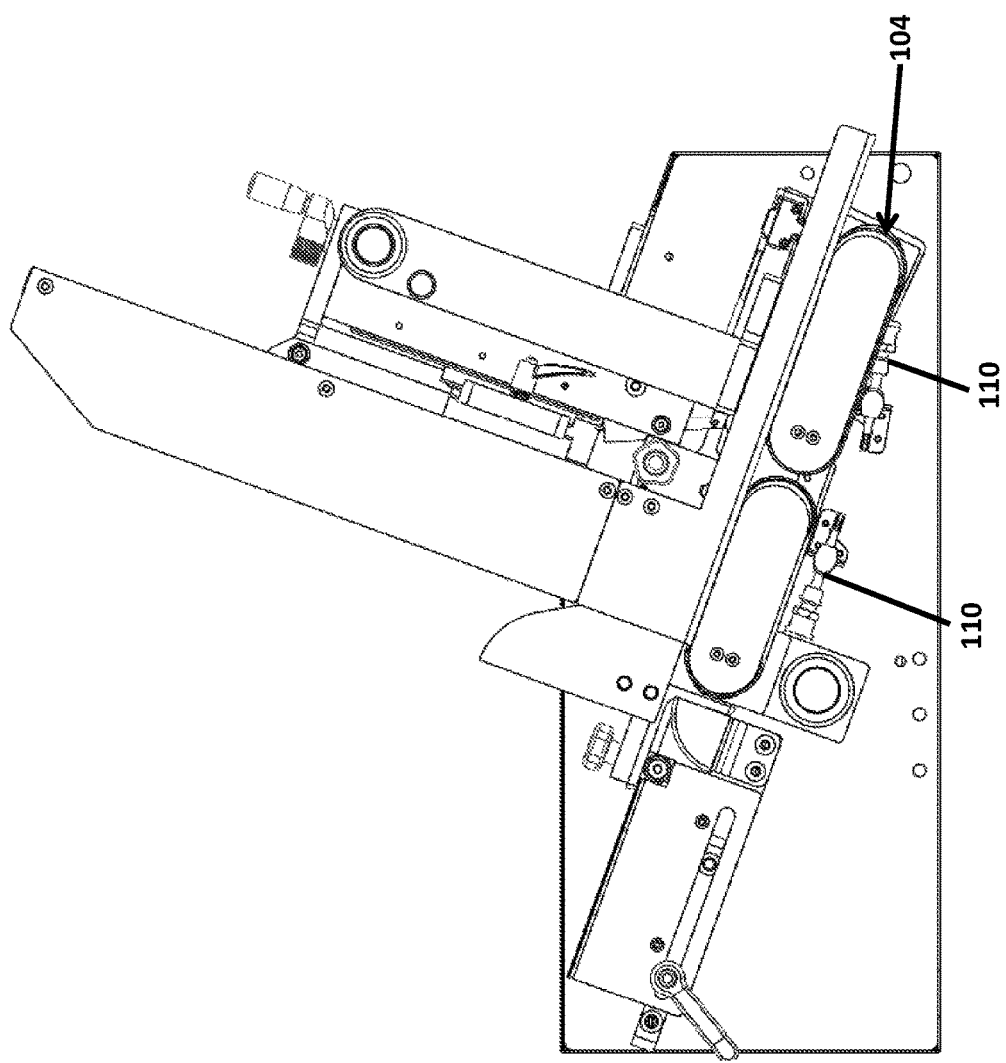
FIG. 4 is an opposing side view of the friction feeder of FIG. 3 according to certain embodiments.
Figure 5:
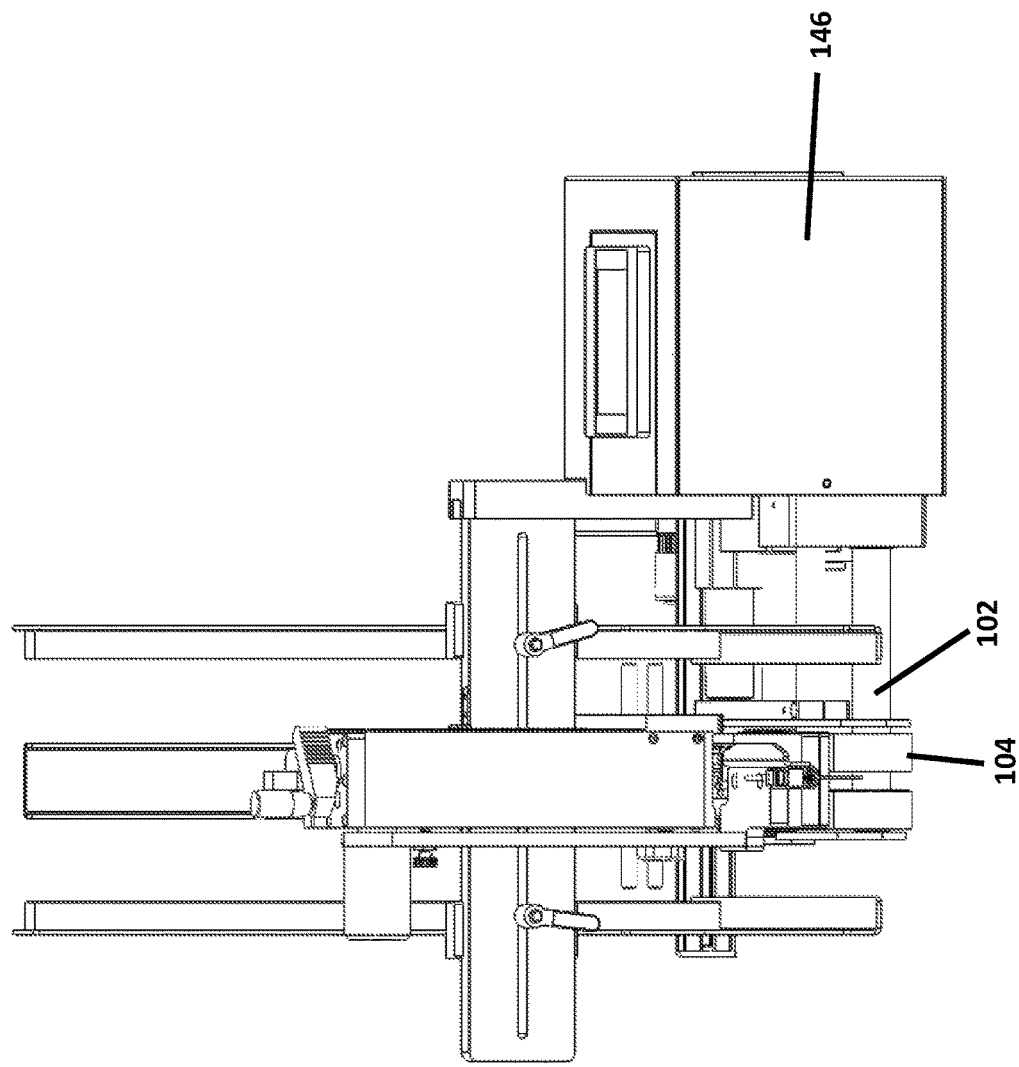
FIG. 5 is a front view of a friction feeder according to certain embodiments.
Figure 6:
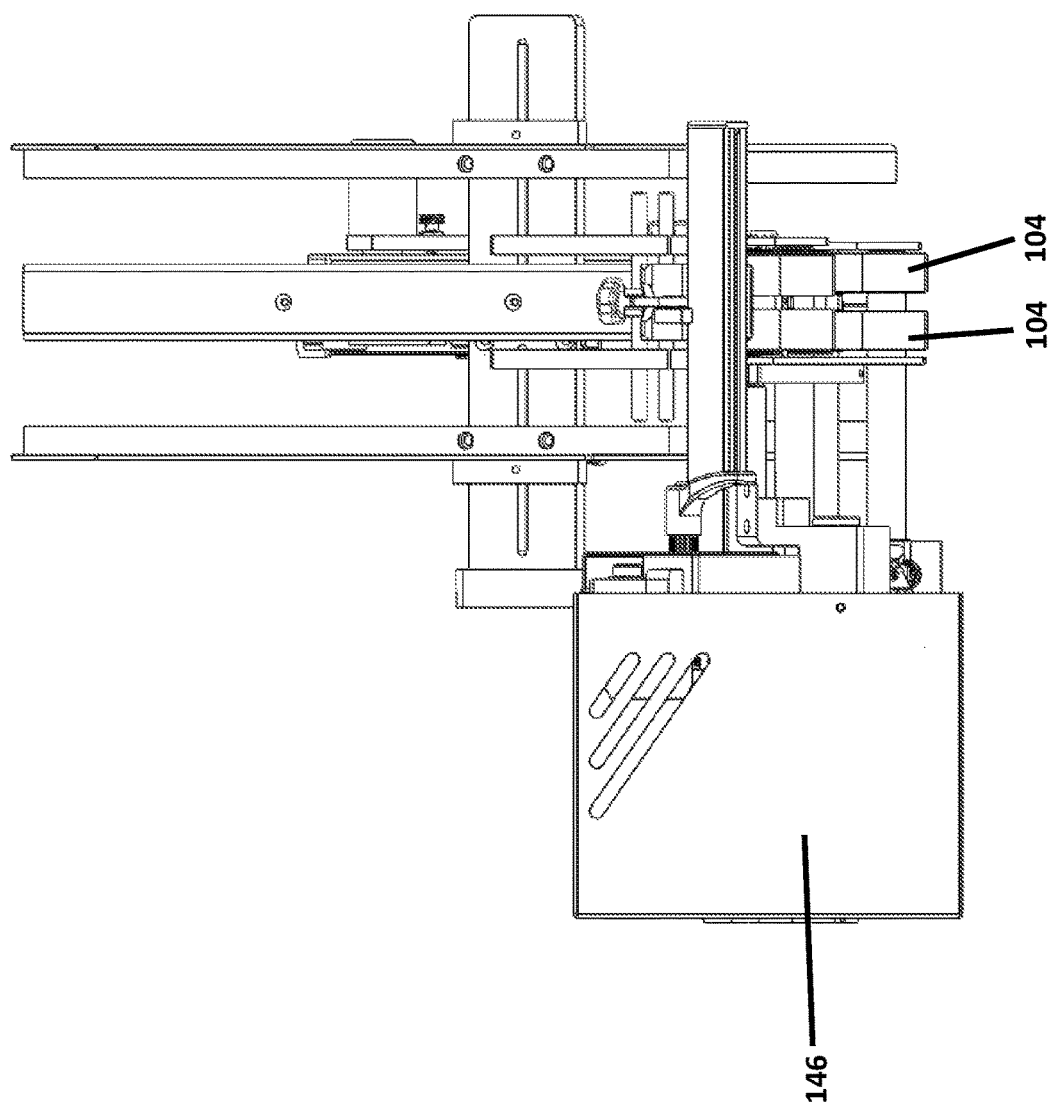
FIG. 6 is a rear view of a friction feeder according to certain embodiments.
Figure 7:
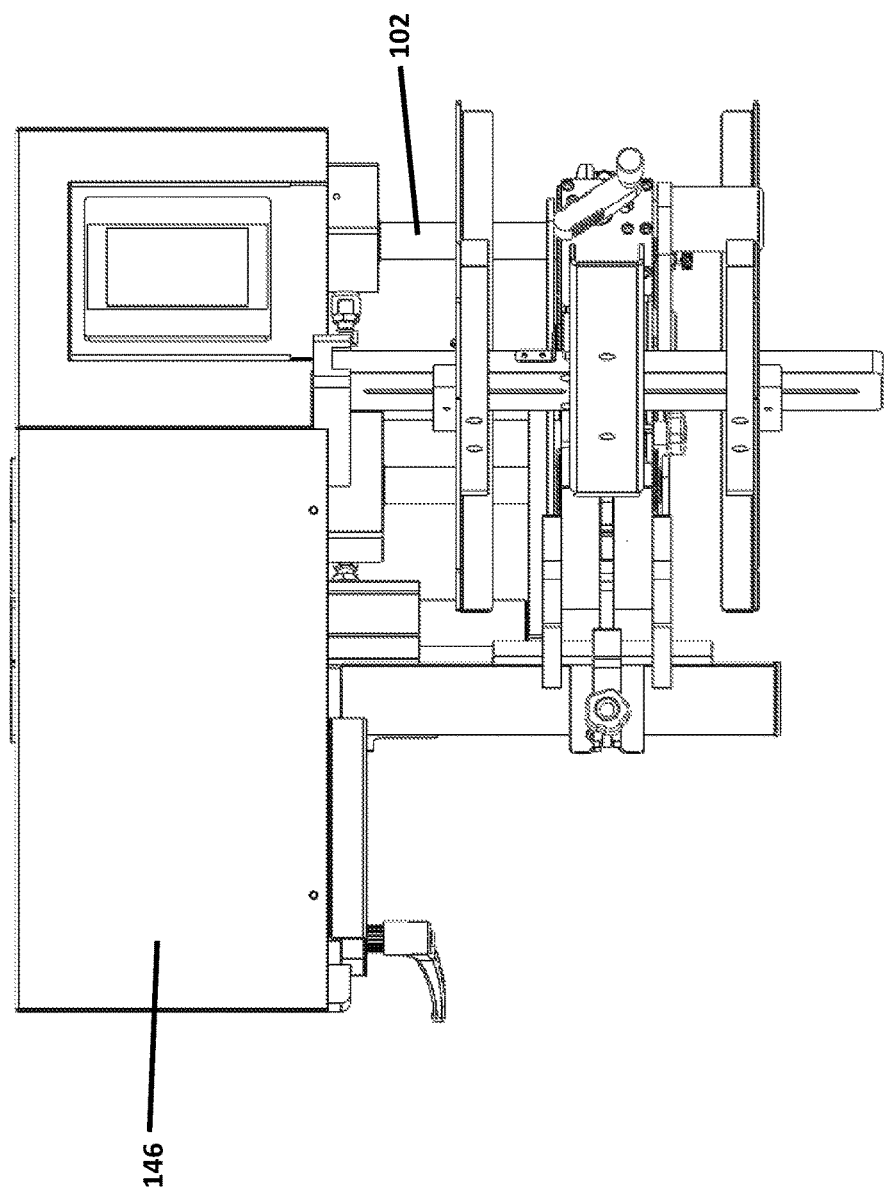
FIG. 7 is a top view of a friction feeder according to certain embodiments.
Figure 8:
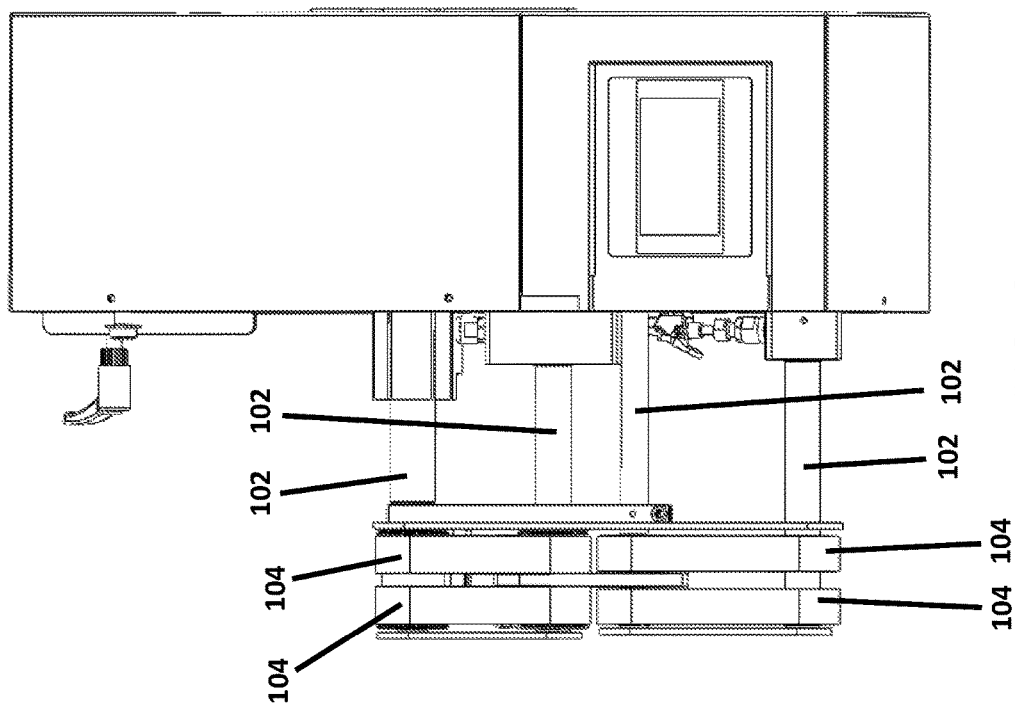
FIG. 8 is a bottom view of a friction feeder showing cantilevered rollers according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention. It is understood that the various features and aspects discussed herein may be used in any combination, or in isolation, without departing from the scope of the present invention.

Referring to FIGS. 1-23 generally, a friction feeder 100 includes wear items such as drive belts, friction belts, and meter wheels/friction wheels. The friction feeder 100 is configured to allow for the removal and replacement of some or all of these wear parts without the need to significantly disassemble the machine and without the need for tools. Each wear part can be far more quickly replaced as compared to conventional friction feeders. This minimizes down time and operator costs.

One aspect of certain embodiments is having an open-sided roller configuration where the rollers 102 around which the friction belts 104 turn are exposed on one side in a cantilevered fashion. This is very clear to see in FIG. 8, for example. Exposing one end of the cantilevered rollers 102 in this manner permits the operator to easily access the friction belts 104, clear jams, etc. without the need to first remove one side of the machine housing, which can be necessary in conventional friction feeders.

Benefits of the single-sided or cantilevered configuration include: the machine is completely accessible from the non-drive side; reduced mounting interferences with a parent machine; allows operator to quickly and easily clear product jams or mis-feeds; allows operator to easily perform product set-up and change-over from product to product; design incorporates finger safe operation that eliminates pinch points; reduces catch points for products to fall through and become lodged; and pharmaceutical environments require easy access and easy means for visible verifications.

Figure 9:
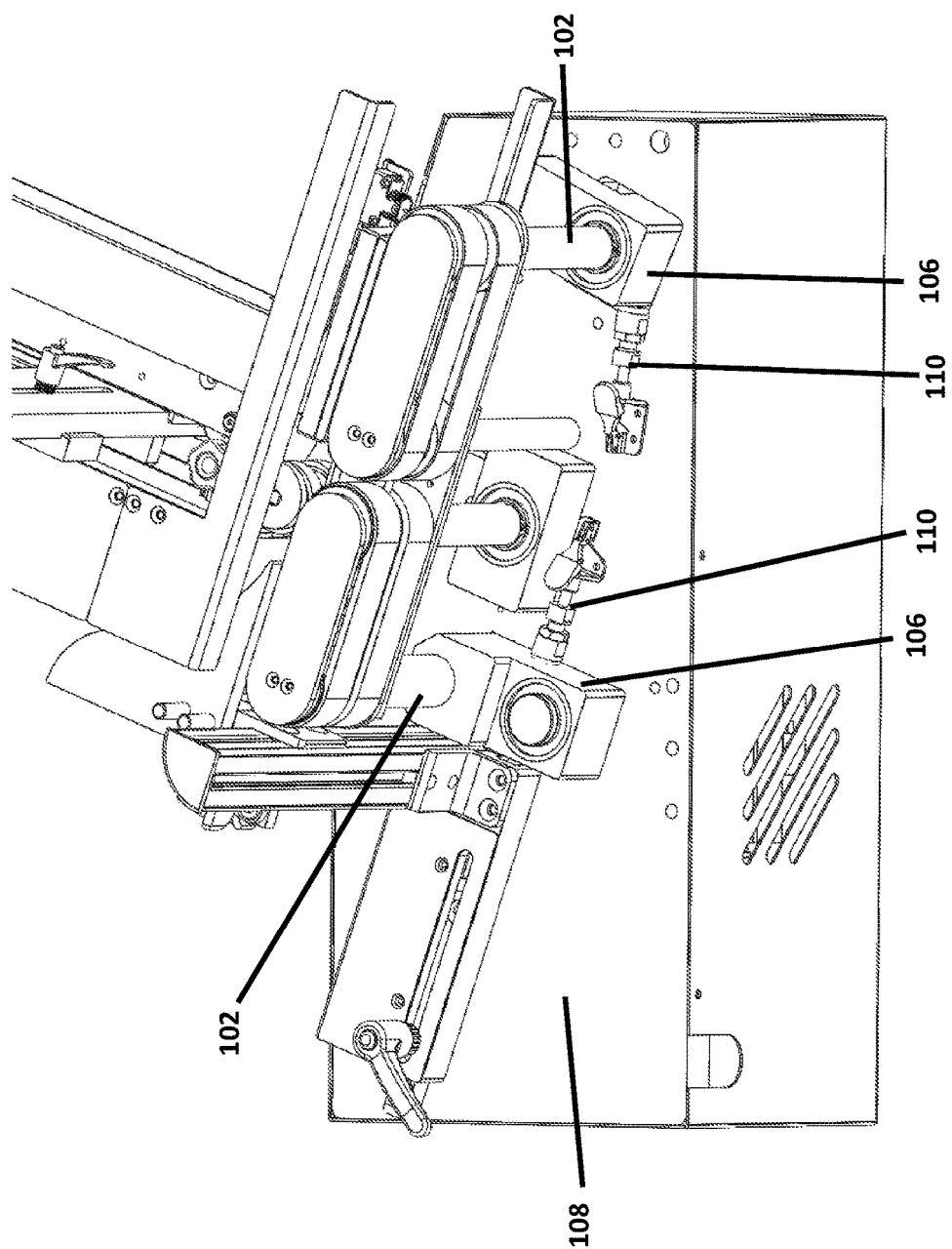
FIGS. 9-11 are perspective views of a friction feeder showing removal of the friction belts according to certain embodiments.
Figure 10:
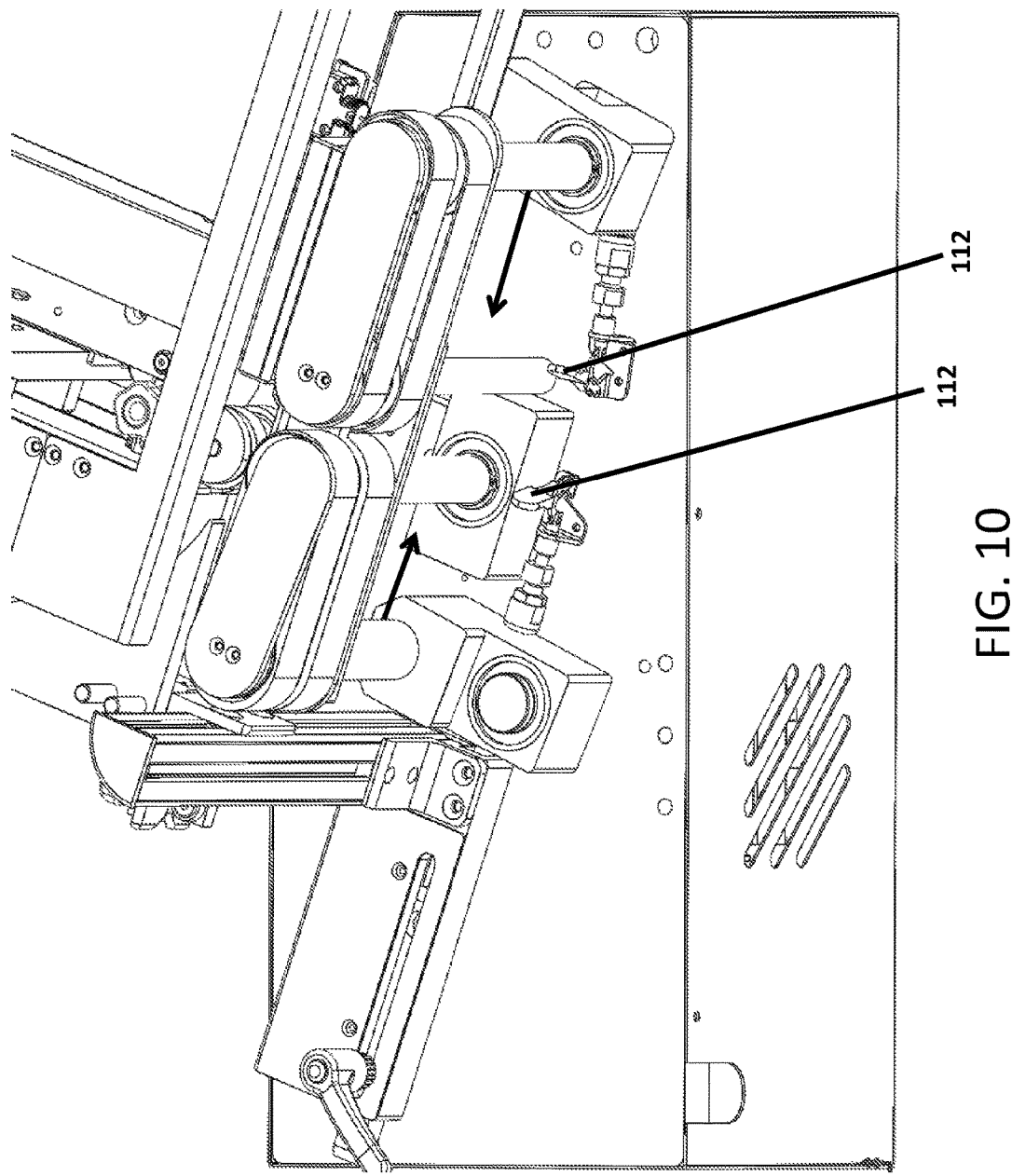
Figure 11:
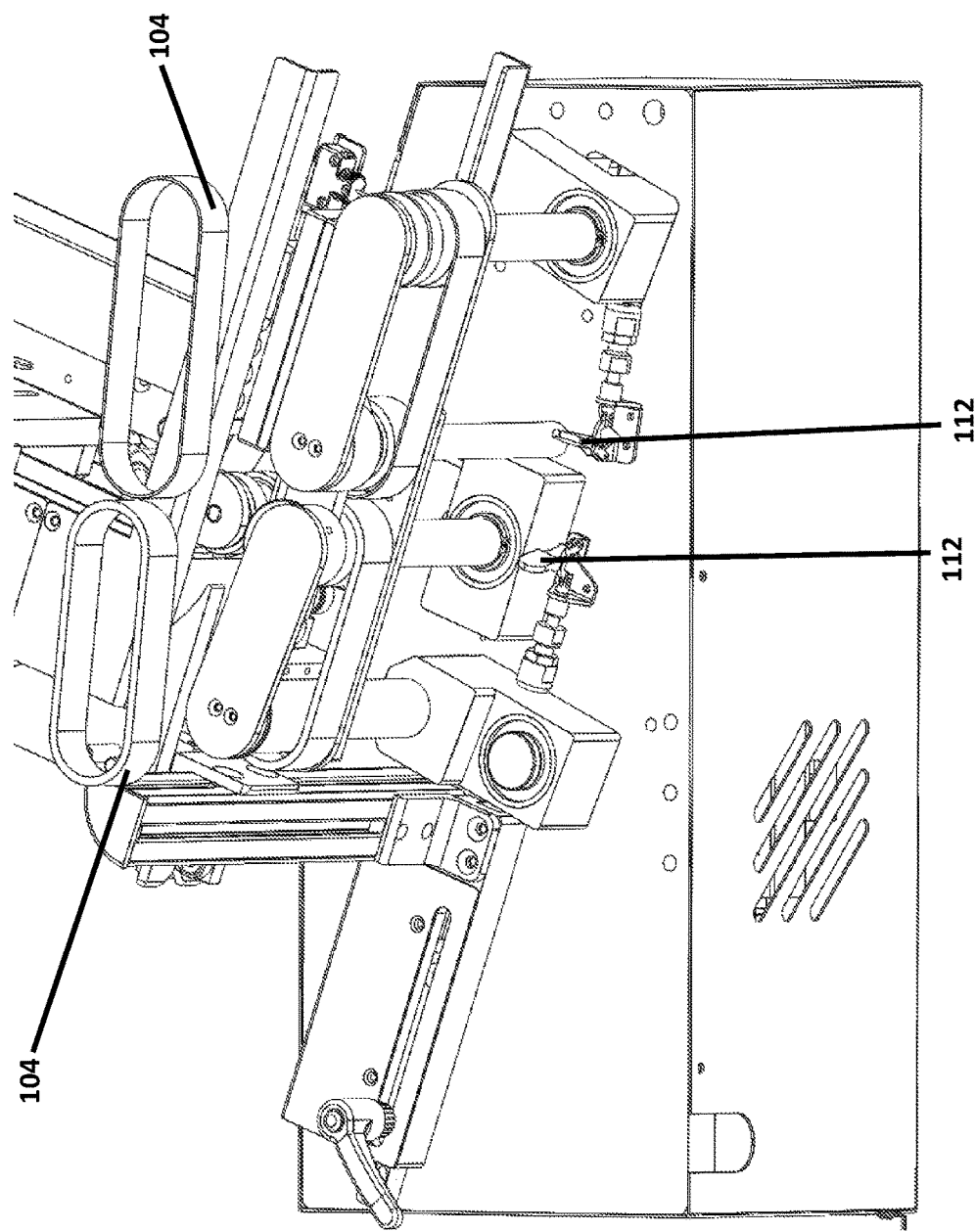

In another aspect, the friction belts 104 can be easily accessed and quickly replaced without the use of tools. Referring to FIGS. 9-11, steps of the friction belt 104 removal process can be seen. Each belt 104 connects two adjacent rollers 102. The spacing between adjacent rollers 102 is ordinarily maintained to keep the friction belts 104 in tension. At least one roller 102 in each pair of rollers is rotationally disposed in a bearing assembly block 106 that is pivotally or linearly slidably mounted to a frame plate 108.

A piston 110 is provided to maintain the movable blocks 108 in the belt tensioning position where the rollers are at their maximum opposing distance from one another as shown in FIG. 9. Releasing or contracting the piston 110 by actuating a hand (manual) release flange 112 as shown in FIG. 10 causes the movable roller of the pair or rollers to move laterally towards its paired opposing roller as shown by the arrows in FIG. 10. This lateral movement releases the tension in the friction belts 104 around each pair of rollers 102. The belts 104 can then be easily removed from over the free ends of the rollers 102 as shown in FIG. 11. New or replacement belts can then be placed over the cantilevered ends 103 of the rollers and secured by performing the steps discussed above in a reverse order.

Benefits of the tool-free friction belt replacement features can include: allowing friction belts to be removed without the use of tools; minimization of effort and time required to change belts as there are no captive belts; and the belt tension remains constant. This aspect also allows the operator to change the "wear items" (friction transfer belts) without the use of tools and perform the operation typically in less than one minute.

In a further aspect of certain embodiments, the roller ball (meter wheel) 116 can be revealed for removal and replacement without the use of tools. The operator can also be provided with clear access to the feed area where the wheel is located to aid in the act of product setup, and clearing a jam or misfeed.

Figure 12:
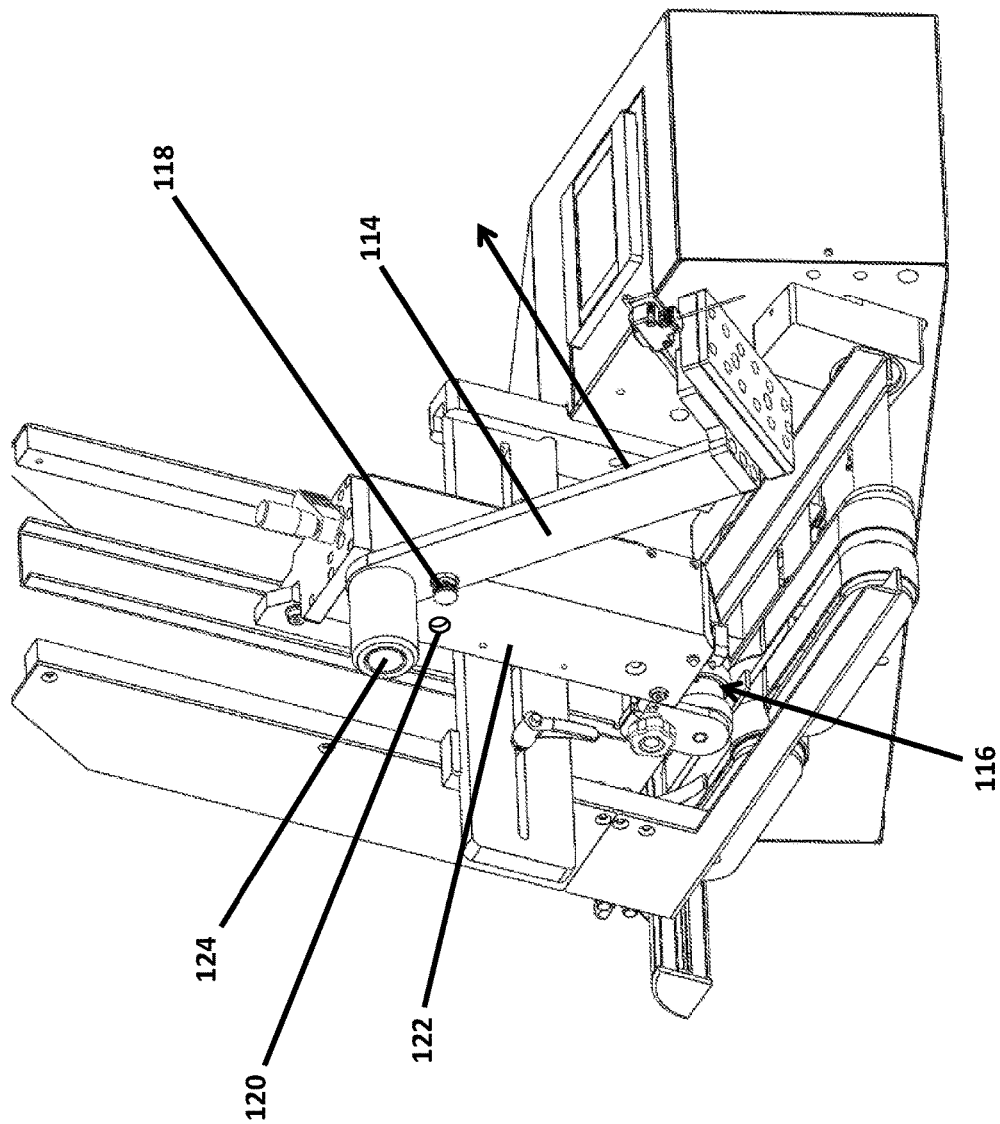
FIG. 12 is a perspective view of a friction feeder with a raised feeder discharge according to certain embodiments.

Referring to FIG. 12, a cantilevered arm 114 pivots away from its normally vertical orientation to allow access to the feed area where the meter wheel 116 is located. A spring-loaded release piston 118 disposed on the arm 114 normally engages a respective aperture 120 defined in a side panel of the metering tower 122. Pulling the release mechanism 118 allows the arm 114 to freely pivot or swing about pivot axis 124 to a maintenance position as indicated in FIG. 12.

The piston of the spring-loaded release mechanism 118 then extends to rest against the forward side of the tower 122 sidewall as shown in FIG. 12 so that the arm 112 is maintained in the offset or service position. The meter wheel 116 assembly and feed area can now be easily accessed.

In an additional aspect, the meter wheel 116 drive mechanism comprises a low voltage solenoid 126 that increments the rotation of the wheel to minimize part wear in one location. The solenoid 126 can be seen in FIGS. 15-16.

Figure 13:
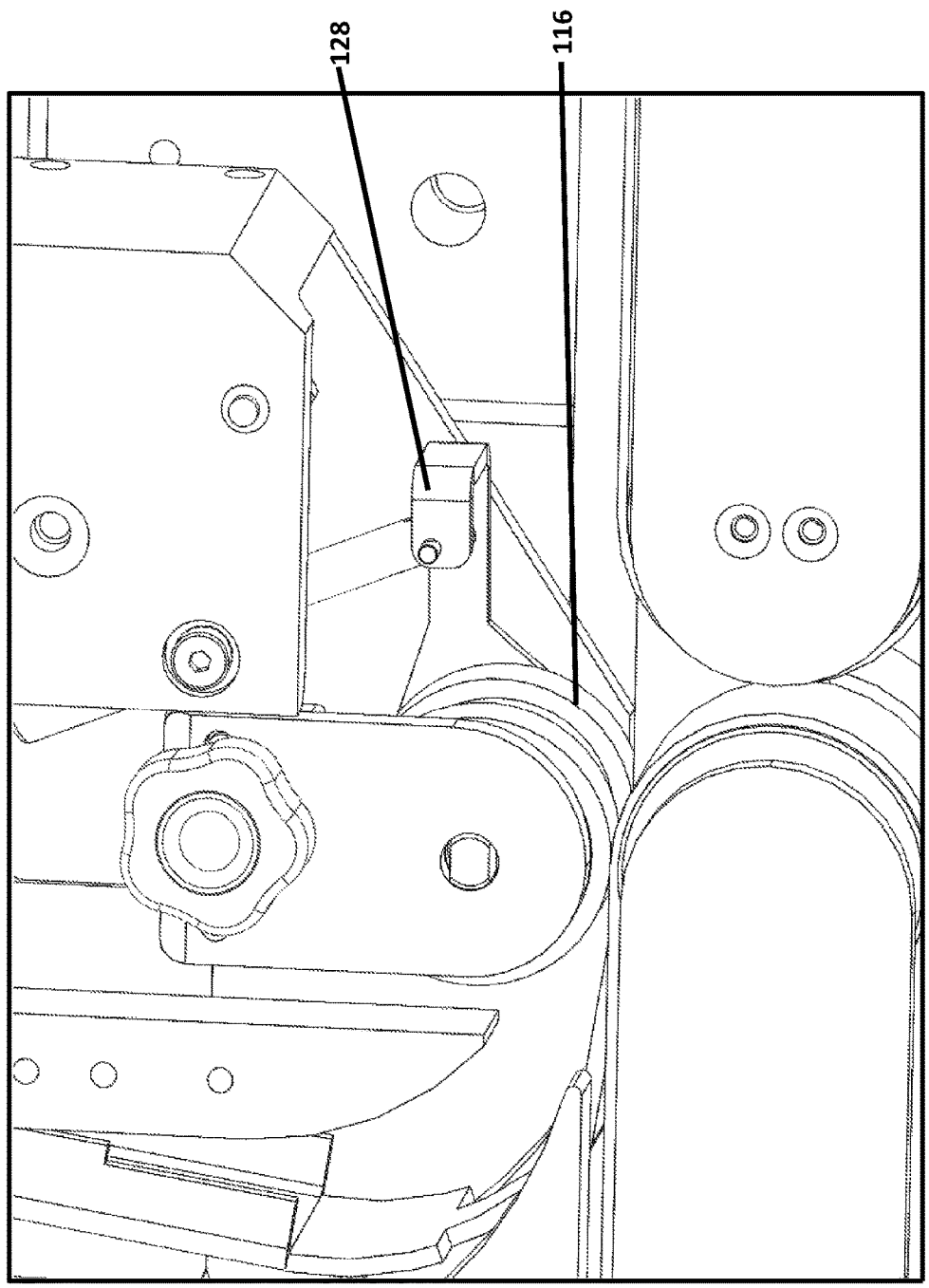
FIGS. 13-14 are detail views of a friction feeder indexing wheel according to certain embodiments.
Figure 14:
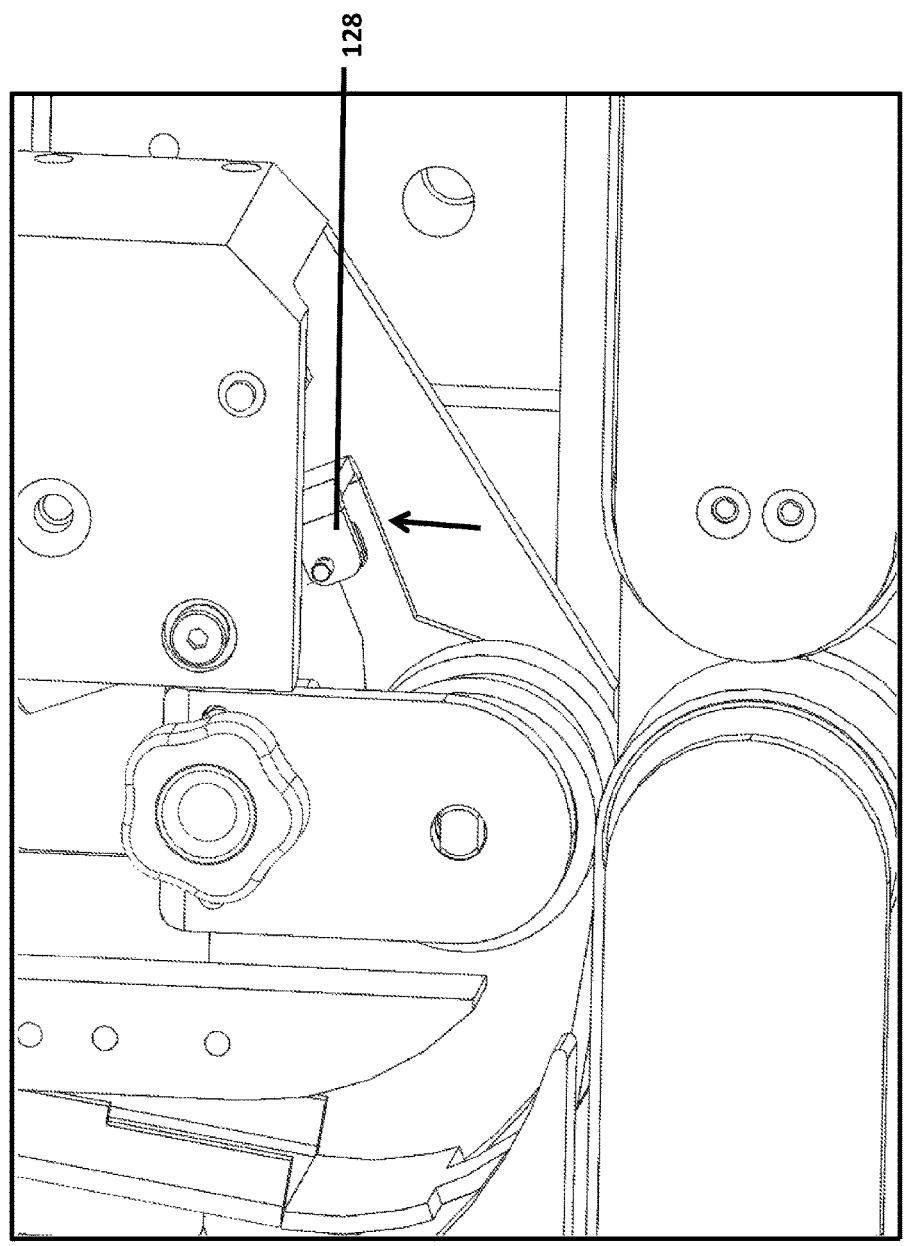
Figure 15:
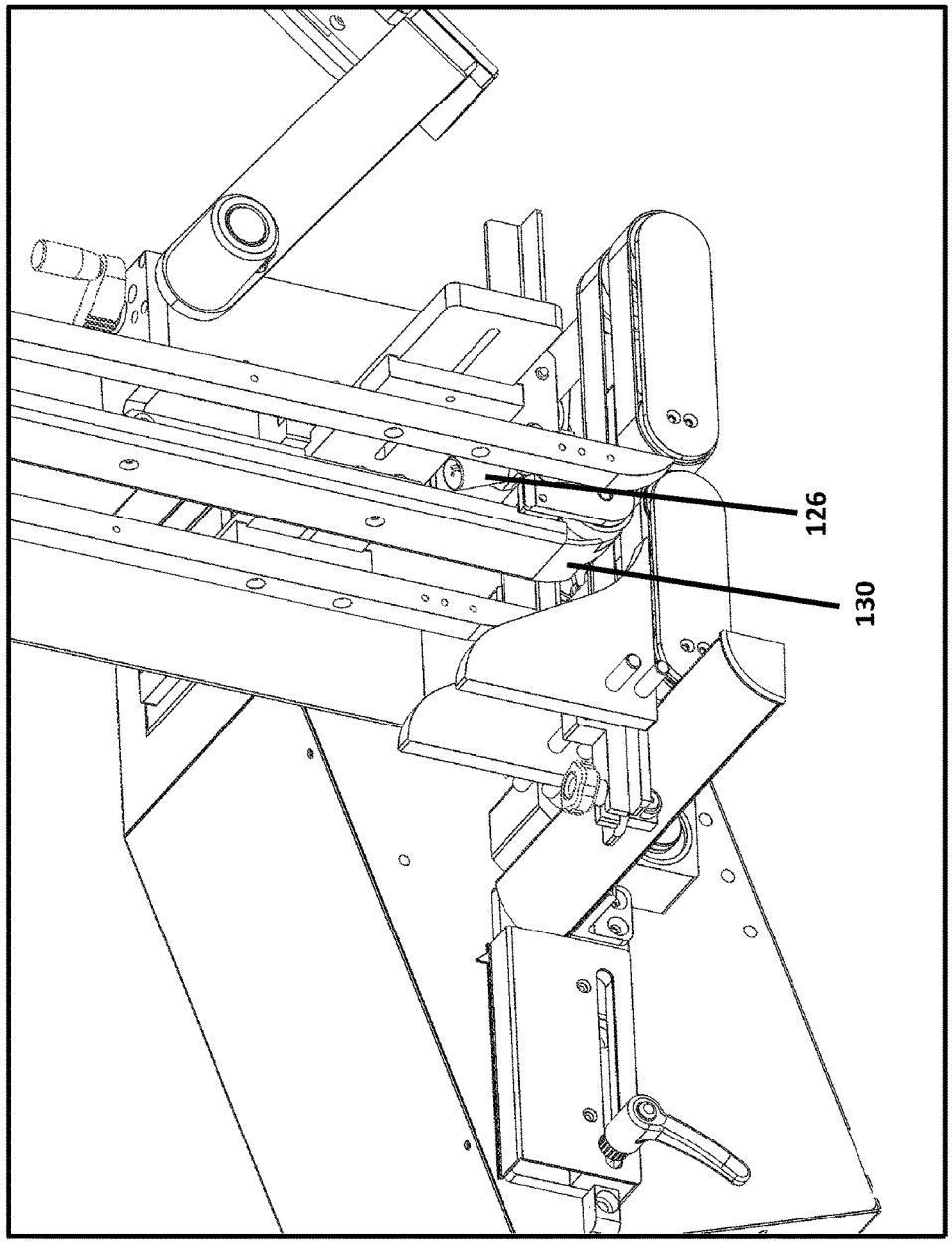
FIGS. 15-20 are detail views of a friction feeder showing removal of the metering wheel according to certain embodiments.

In a further aspect, the meter wheel assembly 116 can be easily accessed and replaced. As shown in FIGS. 13-14, the meter wheel assembly 116 can be readily accessed when the arm 112 is pivoted out of the way to the service position. Further, a release lever 128 coupled to the wheel 116 can be moved from the operating position in FIG. 13 to the released position in FIG. 14 to release the curved back plate 130 that partially surrounds the wheel 116 as shown in FIG. 15.

Figure 16:
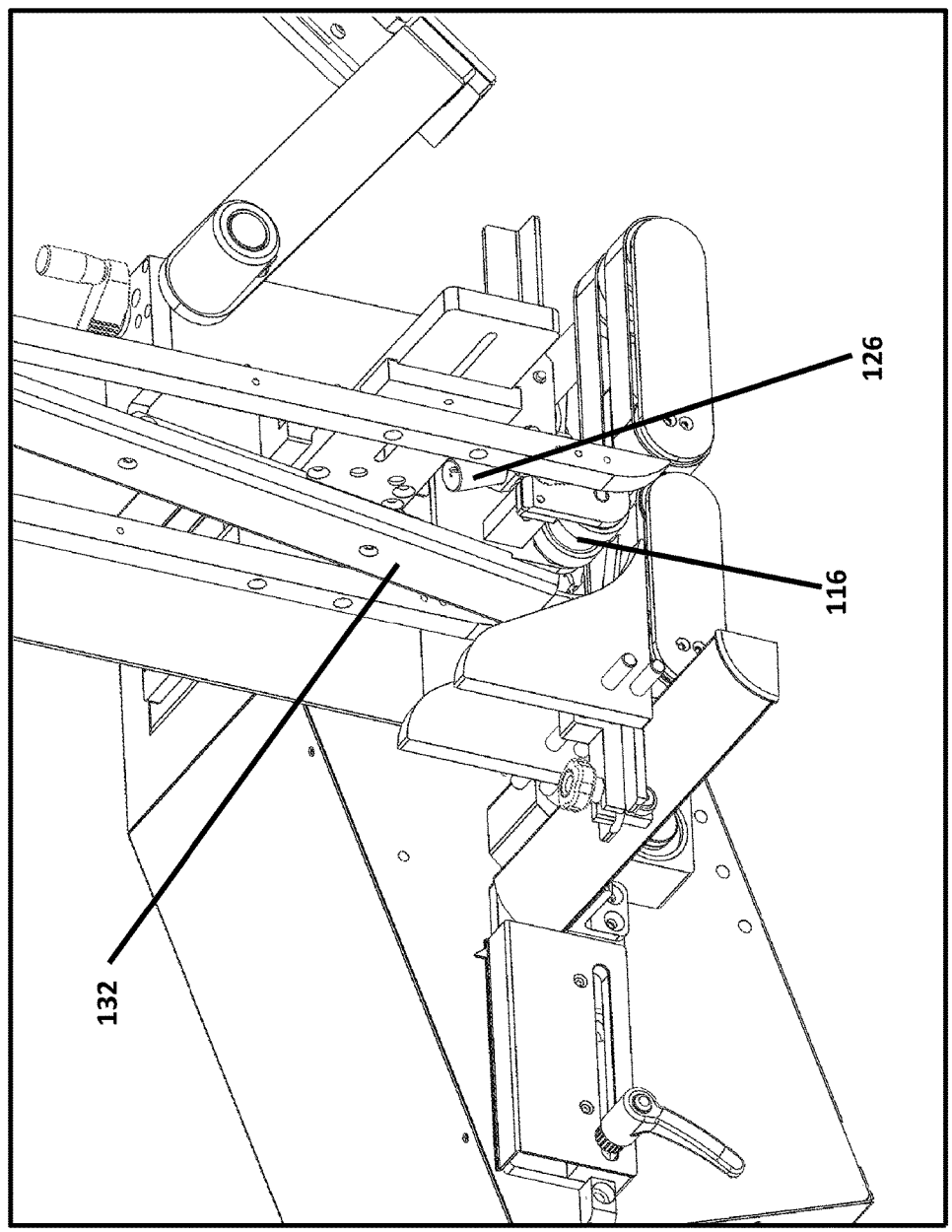
Figure 17:
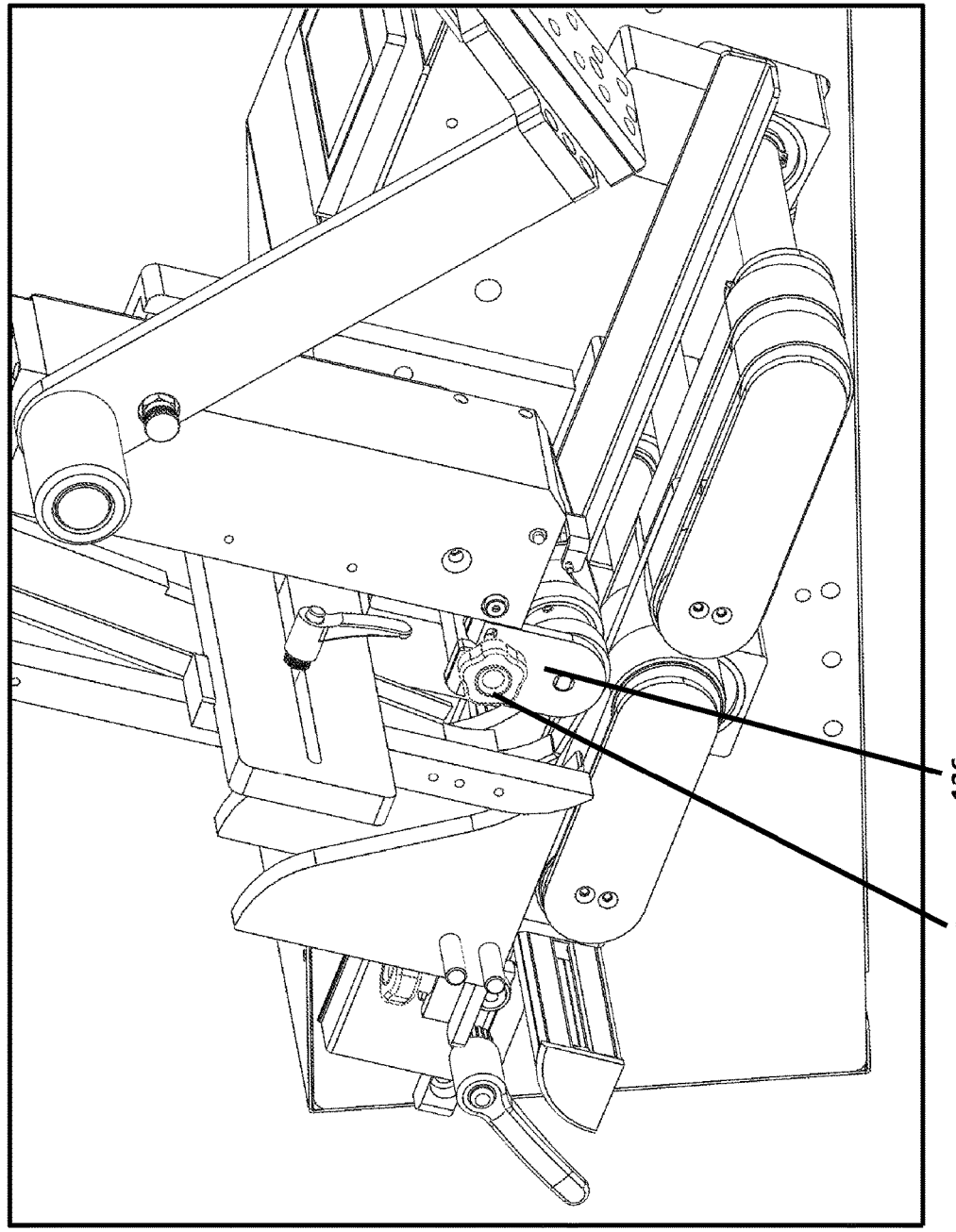

FIG. 16 shows the vertical beam 132 on which the back plate 130 is mounted being moved away from the wheel 116. The beam 132 can be held in place by a plurality of thumb screws (not shown). The wheel 116 is now accessible as shown in FIGS. 16-17.

Figure 18:
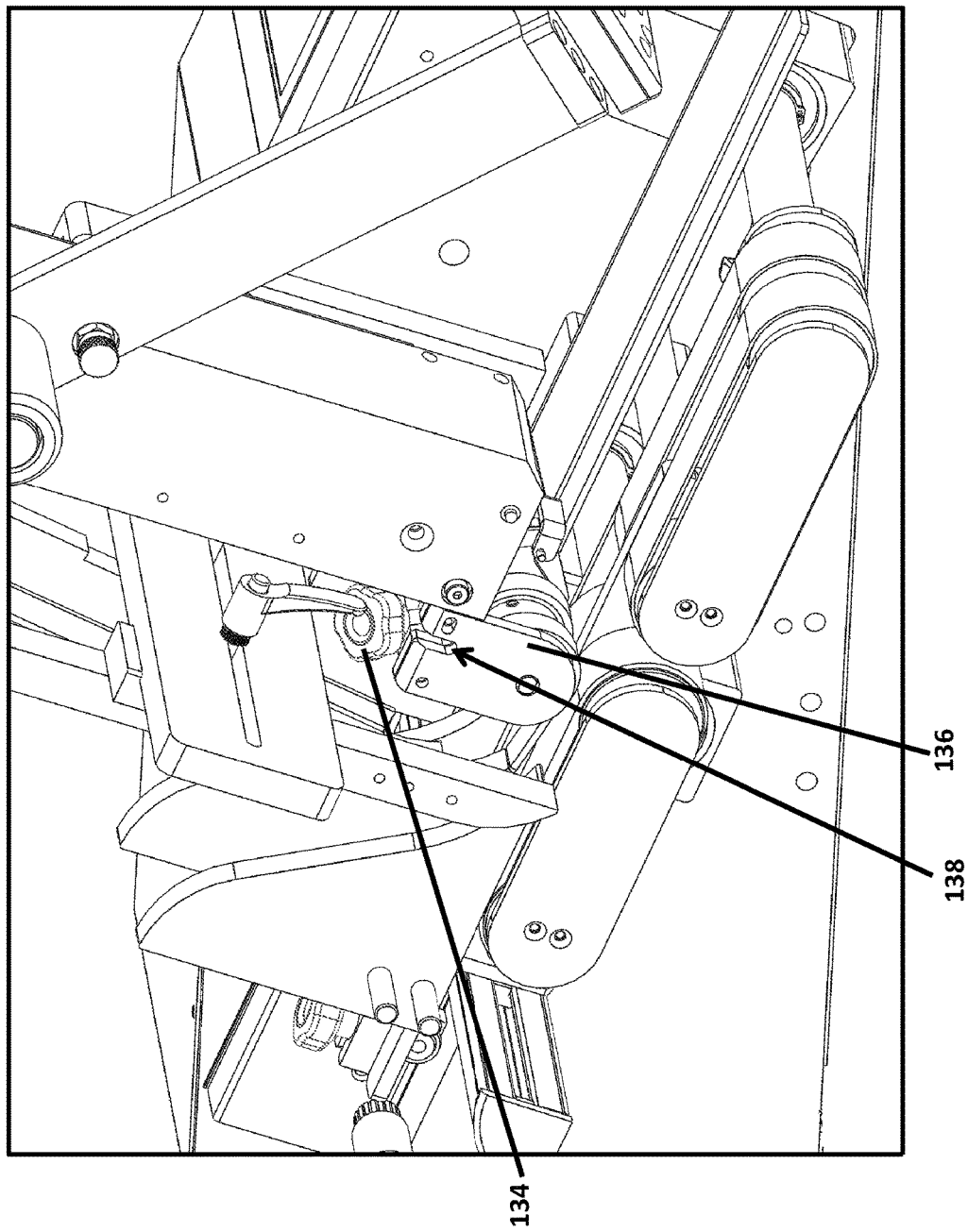
Figure 19:
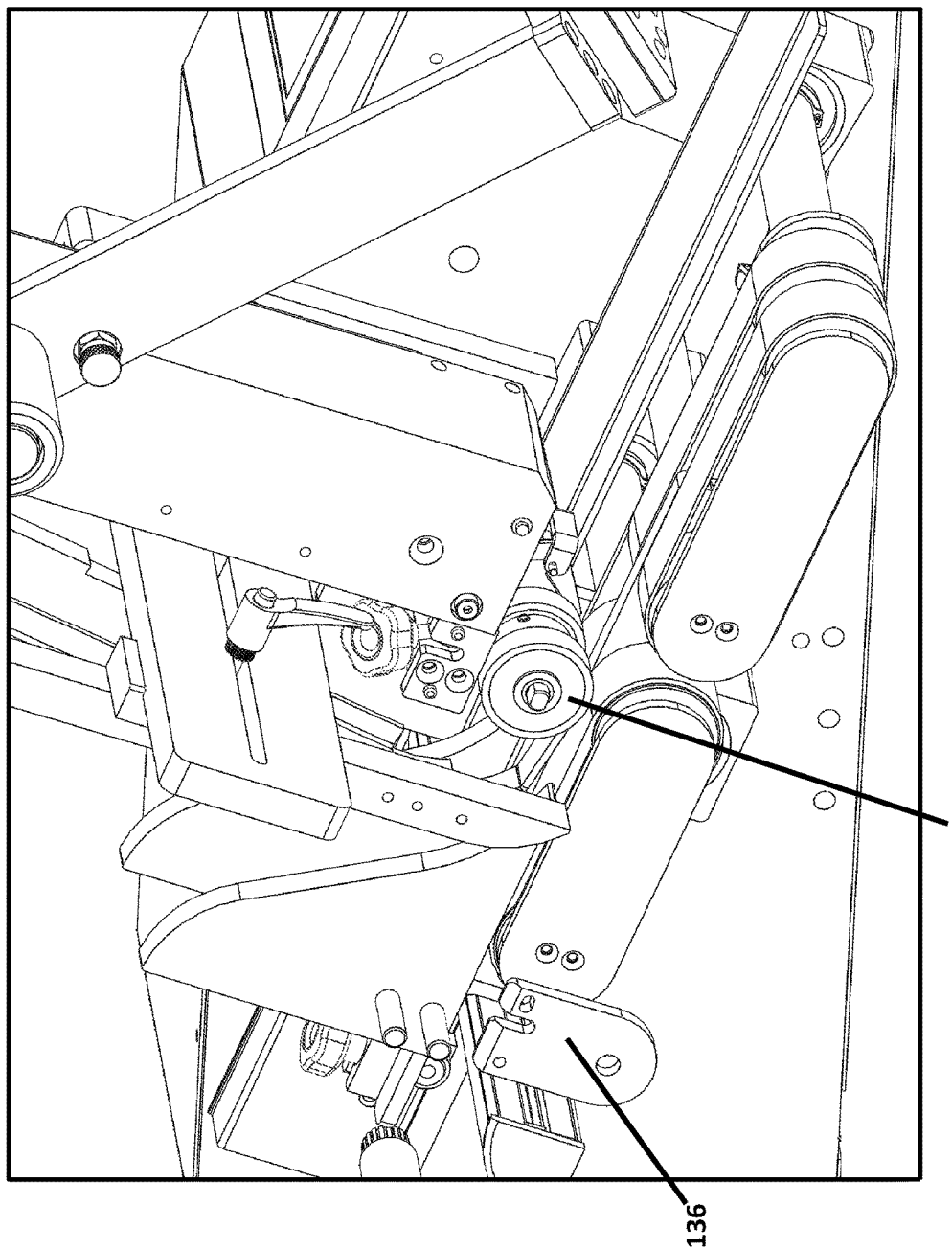
Figure 20:
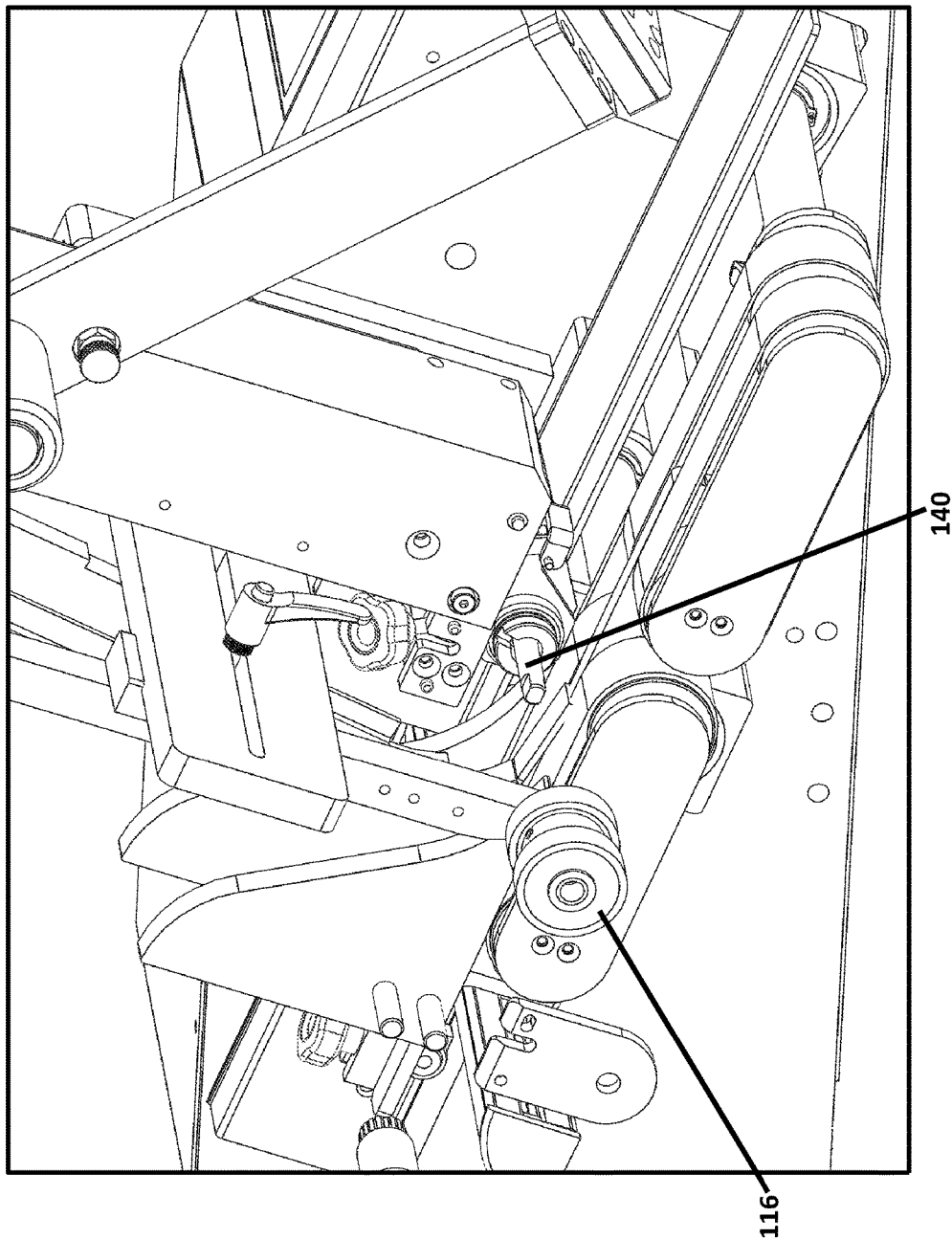

The wheel assembly 116 can be removed by turning the knob 134 to loosen the knob from the wheel assembly's outer side plate 136. Then the knob 134 is pivoted upwards as shown in FIG. 18 away from the slot 138 in the side plate 136. The side plate 136 can then be removed to expose the wheel 116 as shown in FIG. 19. Then the wheel 116 can now be simply slid off of its center shaft 140 as shown in FIG. 20.

A new or replacement meter wheel 116 can be fitted over the shaft 140 and the wheel access steps performed in reverse order to return to the operating configuration.

Benefits of the friction meter wheel removal features can include: the friction meter wheel can be removed without the use of tools; minimal effort and time are required to change meter wheels as the assembly is a complete assembly; and it allows the operator to change the "wear item" (friction meter wheel cartridge) without the use of tools and perform the operation in less than one minute.

Figure 21:
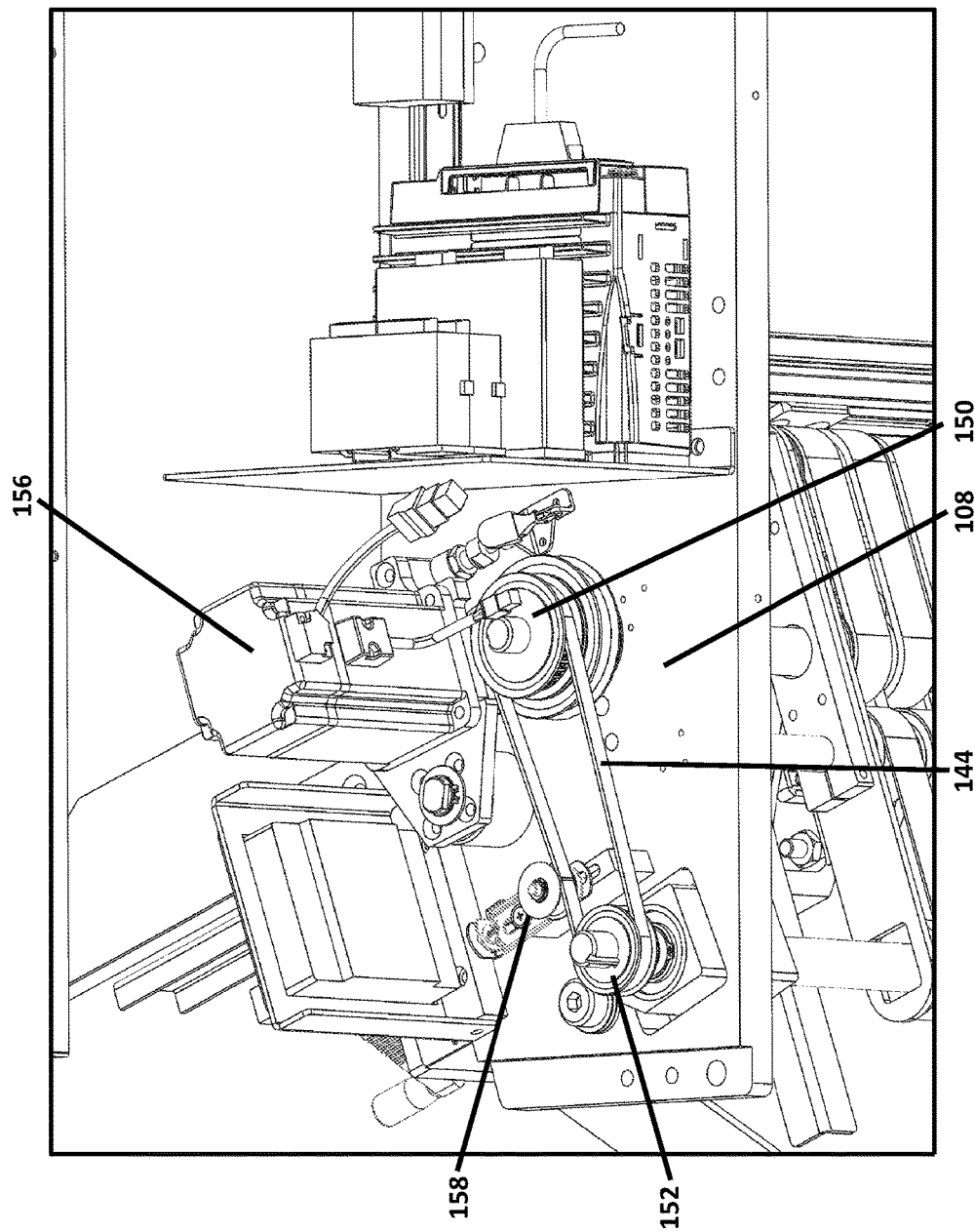
FIGS. 21-23 are views of a friction feeder showing removal of the drive belts according to certain embodiments.
Figure 22:
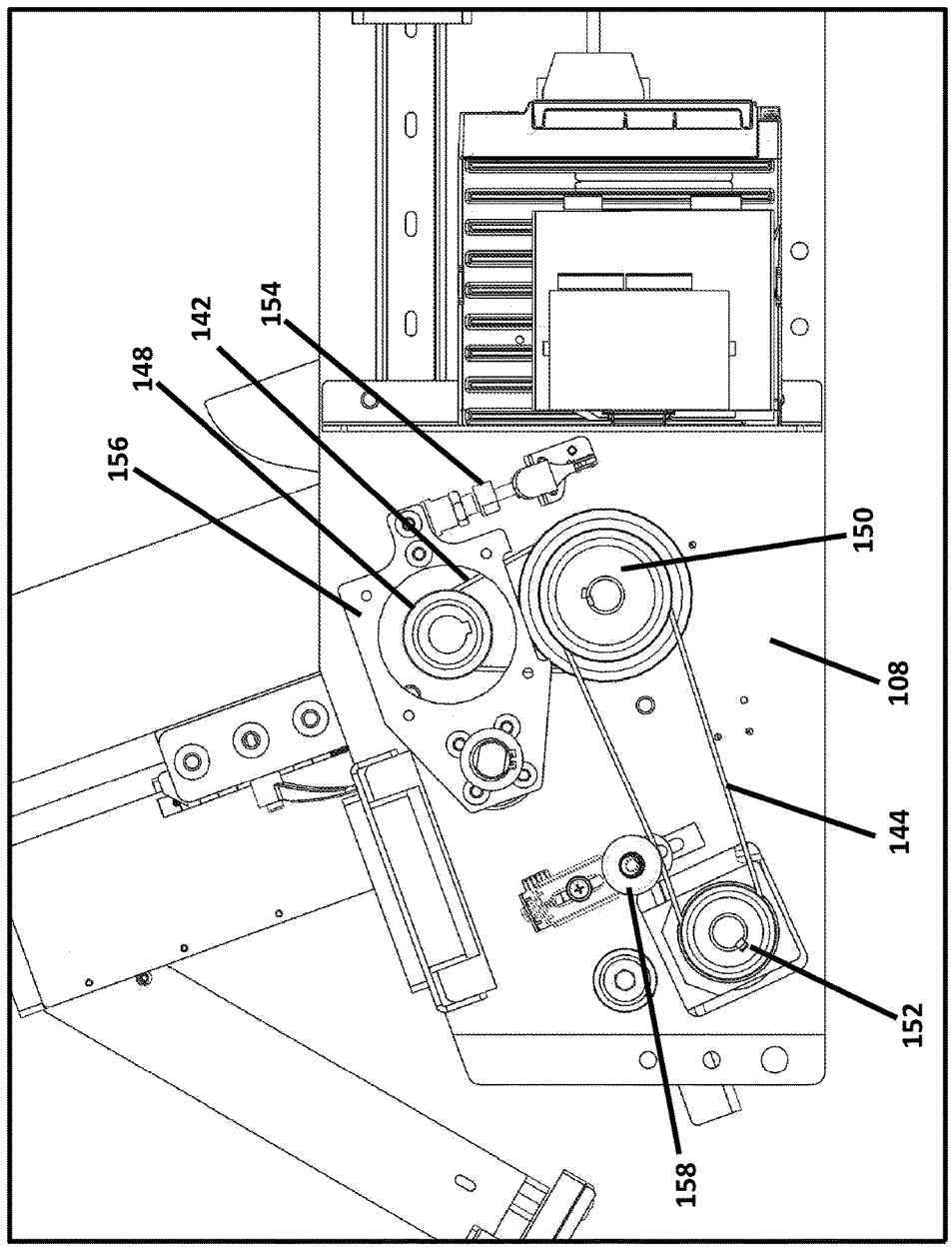
Figure 23:
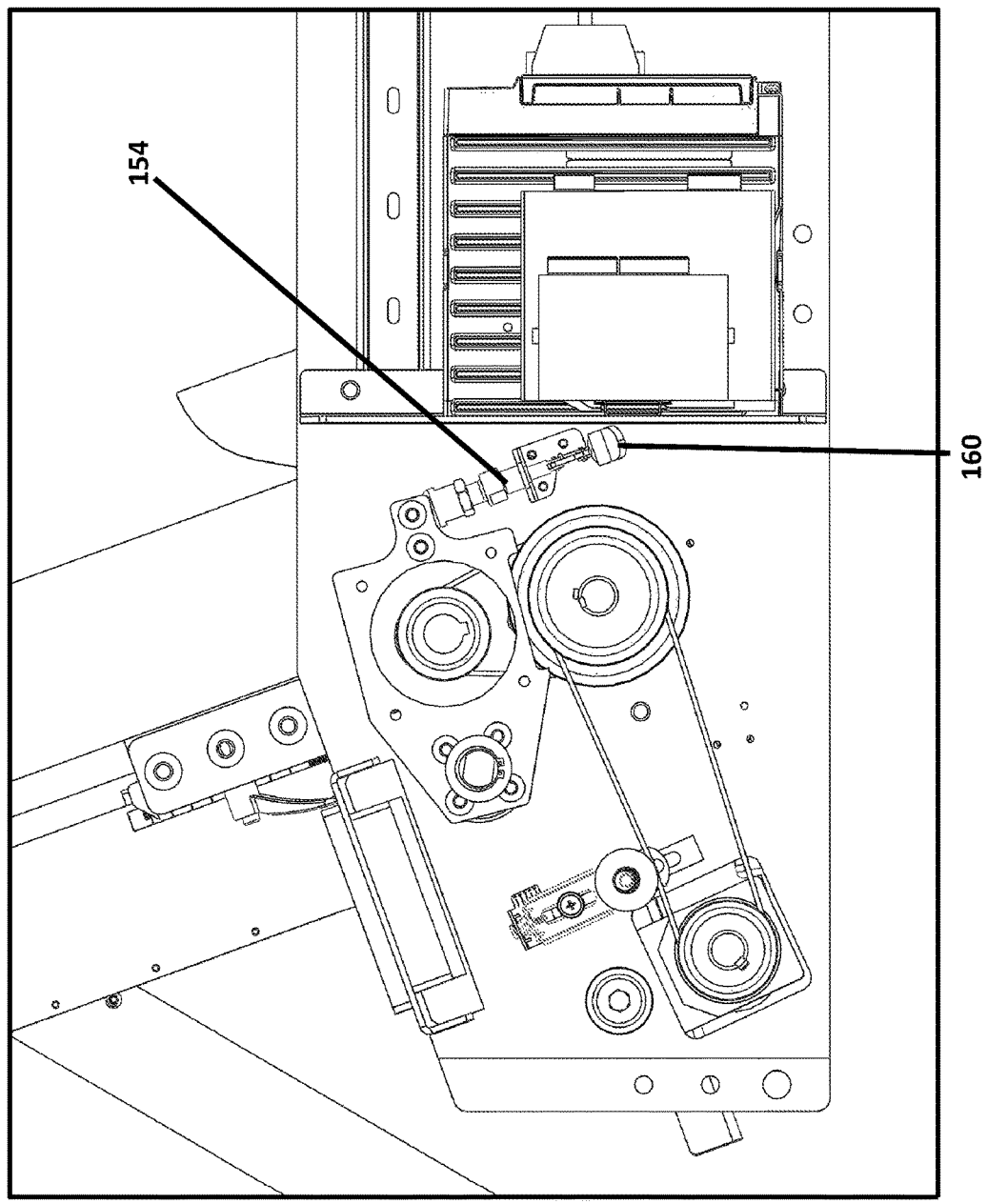

In yet another aspect of certain embodiments, the roller drive pulley belts 142 and 144 can be easily and quickly changed. The main housing 146 covering the drive side of the machine (as shown in FIG. 1, for example) is removed, or an access portal is opened. This exposes the drive motor pulley 148, primary pulley 150 and secondary pulley 152 as shown in FIGS. 21-23.

A releasable piston 154 is coupled to the housing of the drive motor 156. The opposing side of the motor housing is then pivotally coupled to the frame plate 108. This allows the motor housing 156 to be pivoted away from the primary pulley 150 to the maximum extent.

This keeps the belt 142 spanning between the primary pulley 150 and the motor pulley 148 in tension. The tension of the belt 142 between the motor pulley 148 and the primary pulley 150 also causes the primary pulley 150 to move to a position where the belt 144 spanning between the secondary pulley 152 and the primary pulley 150 is placed in tension. An adjustable tensioner 158 further contacts the secondary belt 144 to aid in maintaining tension in the belt 144 between the primary 150 and secondary 152 pulleys.

Alternatively, the secondary pulley 152 can be pivotally mounted to the frame plate 108 and selectably hold the belt 144 in tension with a piston (not shown) similarly to the piston 154 provided to the motor housing.

Releasing the piston 154 by pulling a manual actuation flange 160 outward as shown in FIG. 23, causes the motor housing 156 to pivot towards the primary pulley 150, thereby relieving tension in the motor belt 142. If necessary, the tensioner 158 can be released to slacken the secondary belt 144. Both belts 142, 144 can then be removed and replaced. The steps are performed in reverse to return the machine to its operating state.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A friction feeder device, comprising:
   a frame plate;
   a first cantilevered roller comprising a first end and a second end, wherein the first end is rotationally coupled to the frame plate;
   a second cantilevered roller comprising a first end and a second end, wherein the first end is rotationally coupled to the frame plate via a first movable bearing block;
   a first friction belt spanning across the second ends of each of the first and second cantilevered rollers; and
   a first piston comprising a first end, a second end and a manual release flange, wherein the first end is coupled to the frame plate and the second end is coupled to the first movable bearing block, wherein the manual release flange in the engaged position prevents the first end of the first piston from moving towards the second end of the first piston to maintain tension in the first friction belt, and wherein the manual release flange in the released position allows the first end of the first piston to move towards the second end of the first piston to allow the second ends of the first and second cantilevered rollers to move towards one another to release tension in the first friction belt.

2. The friction feeder device of claim 1, further comprising a second friction belt disposed adjacent to the first friction belt and spanning across the second ends of each of the first and second cantilevered rollers.

3. The friction feeder device of claim 1, further comprising:
   a third cantilevered roller comprising a first end and a second end, wherein the first end is rotationally coupled to the frame plate;
   a fourth cantilevered roller comprising a first end and a second end, wherein the first end is rotationally coupled to the frame plate via a second movable bearing block;
   a third friction belt spanning across the second ends of each of the third and fourth cantilevered rollers; and
   a second piston comprising a first end, a second end and a manual release flange, wherein the first end is coupled to the frame plate and the second end is coupled to the second movable bearing block, wherein the manual release flange in the engaged position prevents the first end of the second piston from moving towards the second end of the second piston to maintain tension in the third friction belt, and wherein the manual release flange in the released position allows the first end of the second piston to move towards the second end of the second piston to allow the second ends of the third and fourth cantilevered rollers to move towards one another to release tension in the third friction belt.

4. The friction feeder device of claim 1, further comprising a drive motor, wherein the frame plate defines a first and second side, wherein the first and second cantilevered rollers extend away from the first side of the frame plate and a drive motor extends away from the second side of the frame plate.

5. The friction feeder device of claim 4, further comprising a main housing secured to the frame plate and enclosing the drive motor, wherein the first and second cantilevered rollers are not housed within an enclosure.

6. The friction feeder device of claim 4, further comprising:
   a motor pulley disposed adjacent the second side of the frame plate which is coupled to the drive motor, wherein the drive motor is pivotally coupled to the second side of the frame plate;
   a primary pulley disposed adjacent the second side of the frame plate which is rotationally coupled to one of the first and second cantilevered rollers;
   a drive belt spanning between the motor pulley and the primary pulley; and
   a second piston comprising a first end, a second end and a manual release flange, wherein the first end is coupled to the drive motor and the second end is coupled to the second side of the frame plate, wherein the manual release flange in the engaged position prevents the first end of the second piston from moving towards the second end of the first piston to maintain tension in the drive belt, and wherein the manual release flange in the released position allows the first end of the second piston to move towards the second end of the second piston to allow the motor to pivot towards the primary pulley to release tension in the drive belt.

7. The friction feeder device of claim 6, wherein the primary pulley is movably coupled to the one of the first and second cantilevered rollers, the friction feeder device further comprising:
   a secondary pulley disposed adjacent the second side of the frame plate; and
   a secondary belt spanning between the secondary pulley and the primary pulley.

8. The friction feeder device of claim 7, further comprising an adjustable tensioner secured to the second side of the frame plate and engaging the secondary belt.

9. The friction feeder device of claim 1, further comprising:
   a metering tower;
   a cantilevered arm pivotally coupled to a metering tower, the cantilevered arm pivoting between a vertical orientation and an offset position; and
   a release piston coupled to the cantilevered arm and located to engage an aperture defined in the metering tower when the cantilevered arm is in the vertical orientation and to engage a sidewall of the metering tower when the cantilevered arm is in the offset position.

10. The friction feeder device of claim 1, further comprising:
a meter wheel located adjacent to the first friction belt; and
a solenoid coupled to the meter wheel to increment rotation of the meter wheel.

11. The friction feeder device of claim 1, further comprising:
a meter wheel located adjacent to the first friction belt; and
a releasable back plate disposed adjacent to the meter wheel, wherein a release lever is coupled to the meter wheel and defines an operating position where the back plate partially surrounds the meter wheel, and a release position where the back plate can be moved away from the meter wheel.

12. The friction feeder device of claim 1, further comprising:
a meter wheel located adjacent to the first friction belt; and
a side plate engaging one end of the meter wheel, wherein the side plate is releasably secured to the meter wheel via a knob disposed in a slot defined in the side plate.

13. A friction feeder system, comprising:
a frame plate;
a drive motor pivotally coupled to the frame plate;
a motor pulley disposed adjacent to the frame plate which is coupled to the drive motor;
a primary pulley disposed adjacent the frame plate and rotationally coupled to a drive roller;
a drive belt spanning between the motor pulley and the primary pulley; and
a piston comprising a first end, a second end and a manual release flange, wherein the first end is coupled to the drive motor and the second end is coupled to the frame plate, wherein the manual release flange in the engaged position prevents the first end of the piston from moving towards the second end of the piston to maintain tension in the drive belt, and wherein the manual release flange in the released position allows the first end of the piston to move towards the second end of the piston to allow the motor to pivot towards the primary pulley to release tension in the drive belt.

14. The friction feeder system of claim 13, further comprising:
a secondary pulley disposed adjacent the frame plate; and
a secondary belt spanning between the secondary pulley and the primary pulley.

15. The friction feeder device of claim 14, further comprising an adjustable tensioner secured to the frame plate and engaging at least one of the drive belt and the secondary belt.

16. A method of replacing wear parts of a friction feeder, the method comprising:
moving a manual release flange of a piston from an engaged position to a released position, thereby contracting a length dimension of the piston and allowing cantilevered ends of a pair of rollers to move towards one another to release tension in a friction belt spanning between the cantilevered ends of the pair of rollers;
removing the friction belt from the cantilevered ends of the pair of rollers;
fitting a replacement friction belt to the cantilevered ends of the pair of rollers; and
moving the manual release flange of the piston from the released position to the engaged position, thereby expanding the length dimension of the piston and forcing the cantilevered ends of the pair of rollers to move away from one another to create tension in a friction belt spanning between the cantilevered ends of the pair of rollers.

17. The method of claim 16, further comprising: moving a manual release flange of a second piston from an engaged position to a released position, thereby contracting a length dimension of the second piston and allowing a drive motor to pivot towards a primary pulley to release tension in a drive belt spanning between a drive pulley and the primary pulley.

18. The method of claim 17, further comprising:
releasing a third piston coupled to a cantilevered arm from an aperture defined in a metering tower;
pivoting the cantilevered arm away from the metering tower to an offset position; and
maintaining the offset position by abutting a portion of the third piston against a side wall of the metering tower.

19. The method of claim 16, further comprising:
releasing a back plate surrounding a portion of a meter wheel; and
moving the back plate away from the meter wheel to expose an interface of the meter wheel with a friction belt.

20. The method of claim 16, further comprising:
releasing a meter wheel by rotating a knob engaged with a side plate engaging one end of the meter wheel;
pivoting the knob away from the side plate;
removing the side plate; and
removing the meter wheel by sliding the meter wheel off of a shaft about which the meter wheel rotates.

* * * * *